No. 748,169. PATENTED DEC. 29, 1903.
H. L. DIXON.
GLASS TANK FURNACE.
APPLICATION FILED JULY 5, 1902.
NO MODEL. 6 SHEETS—SHEET 1.

WITNESSES
INVENTOR

No. 748,169. PATENTED DEC. 29, 1903.
H. L. DIXON.
GLASS TANK FURNACE.
APPLICATION FILED JULY 5, 1902.
NO MODEL. 6 SHEETS—SHEET 2.

WITNESSES INVENTOR

No. 748,169. PATENTED DEC. 29, 1903.
H. L. DIXON.
GLASS TANK FURNACE.
APPLICATION FILED JULY 5, 1902.
NO MODEL.
6 SHEETS—SHEET 3.

WITNESSES

INVENTOR

No. 748,169. PATENTED DEC. 29, 1903.
H. L. DIXON.
GLASS TANK FURNACE.
APPLICATION FILED JULY 5, 1902.
NO MODEL. 6 SHEETS—SHEET 4.

WITNESSES
INVENTOR

No. 748,169. PATENTED DEC. 29, 1903.
H. L. DIXON.
GLASS TANK FURNACE.
APPLICATION FILED JULY 5, 1902.
NO MODEL. 6 SHEETS—SHEET 6.

WITNESSES

INVENTOR

No. 748,169. Patented December 29, 1903.

UNITED STATES PATENT OFFICE.

HENRY L. DIXON, OF PITTSBURG, PENNSYLVANIA, ASSIGNOR TO H. L. DIXON COMPANY, OF PITTSBURG, PENNSYLVANIA, A CORPORATION OF PENNSYLVANIA.

GLASS-TANK FURNACE.

SPECIFICATION forming part of Letters Patent No. 748,169, dated December 29, 1903.

Application filed July 5, 1902. Serial No. 114,401. (No model.)

*To all whom it may concern:*

Be it known that I, HENRY L. DIXON, of Pittsburg, in the county of Allegheny and State of Pennsylvania, have invented a certain new and useful Improvement in Glass-Tank Furnaces, of which the following is a full, clear, and exact description, reference being had to the accompanying drawings, forming part of this specification, in which—

Figure 1:
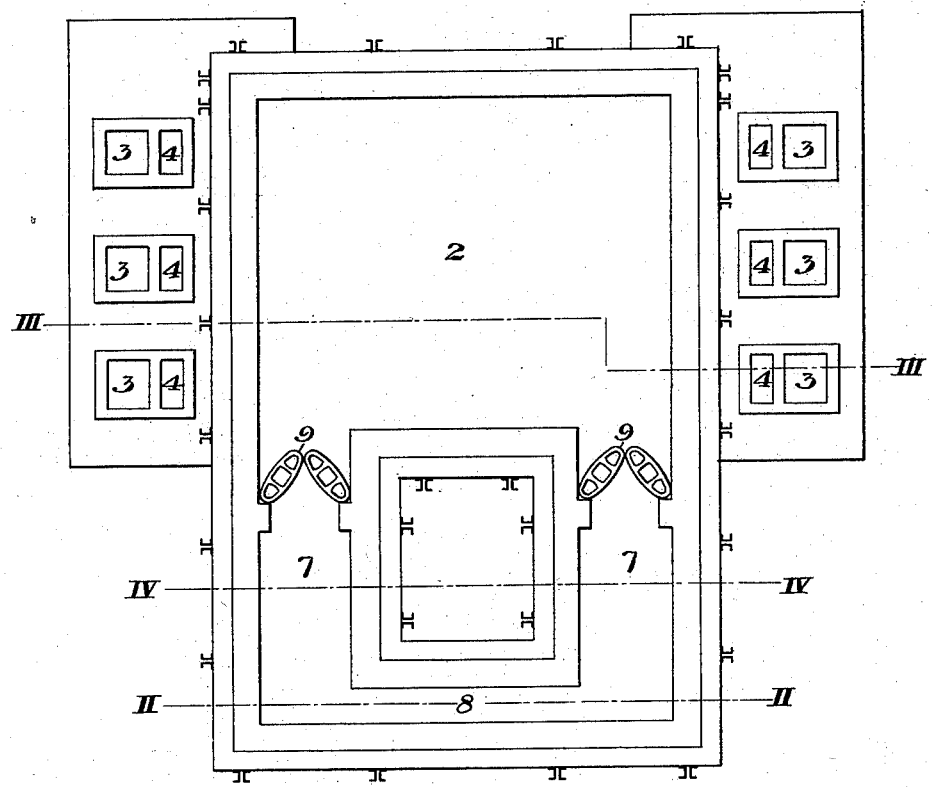
Figure 2:
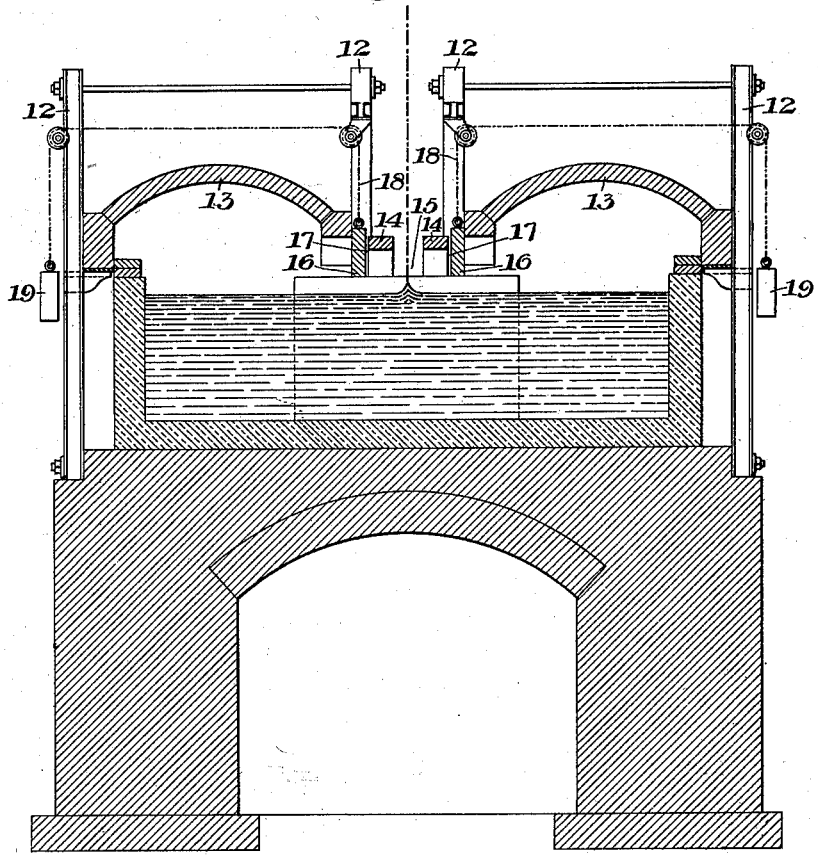
Figure 3:
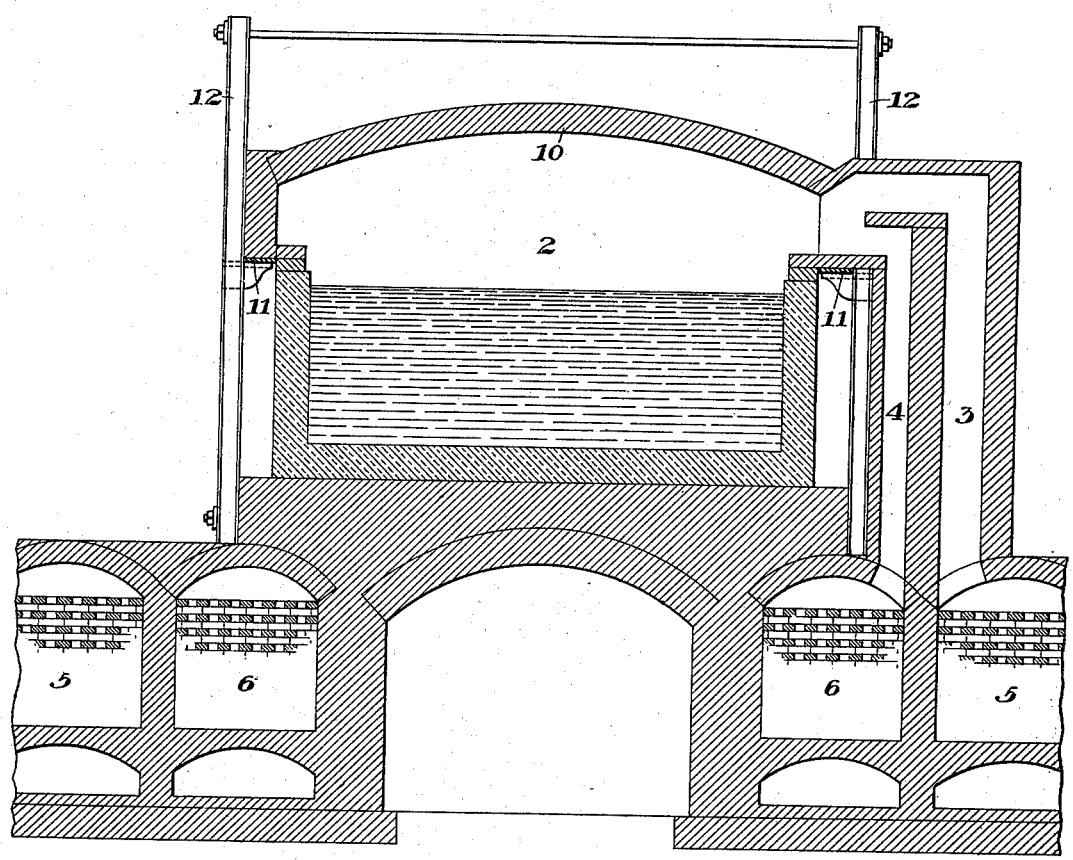
Figure 4:
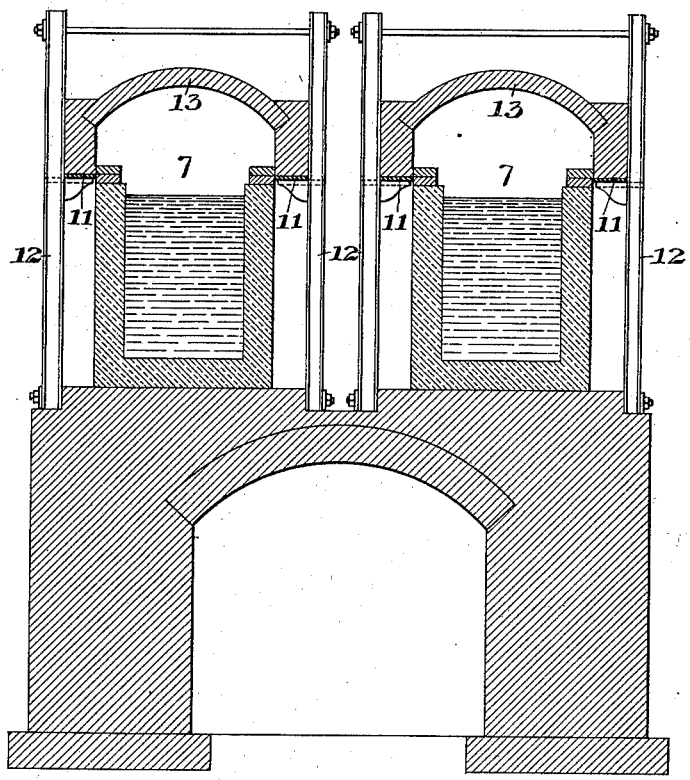
Figure 5:
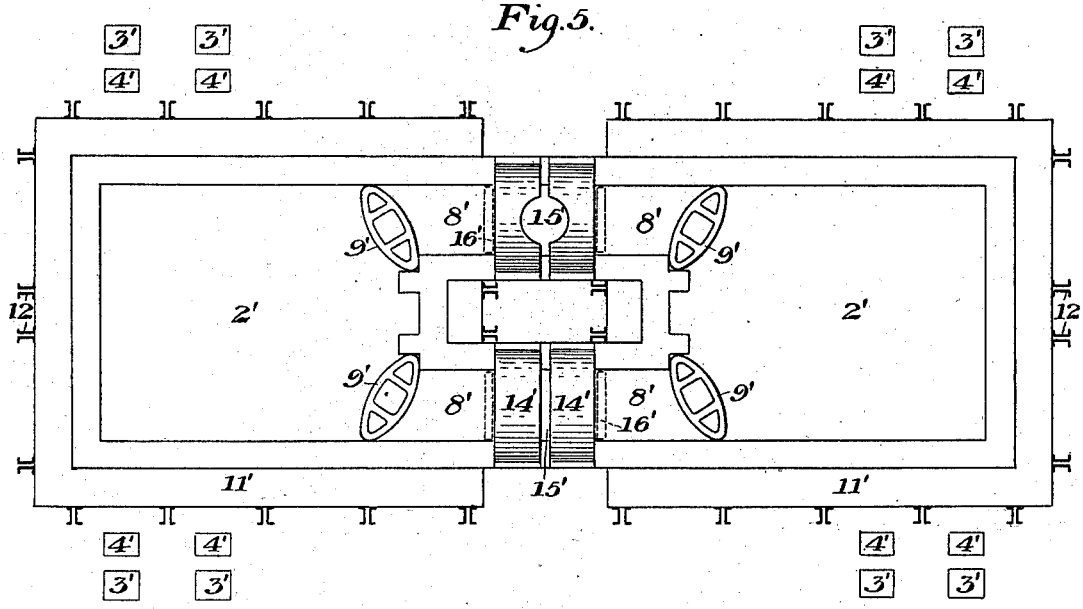
Figure 6:
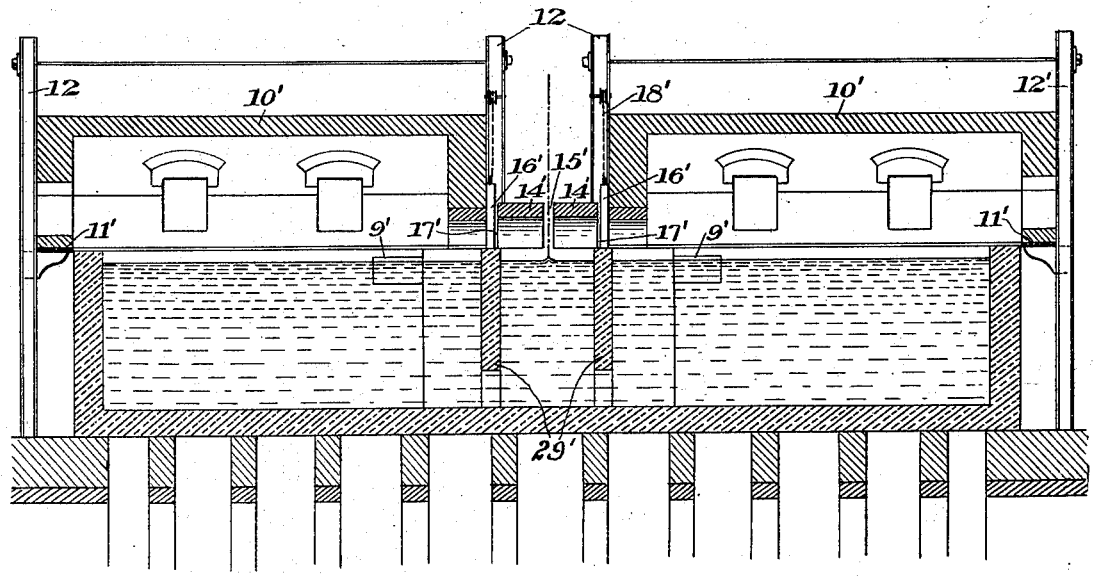
Figure 7:
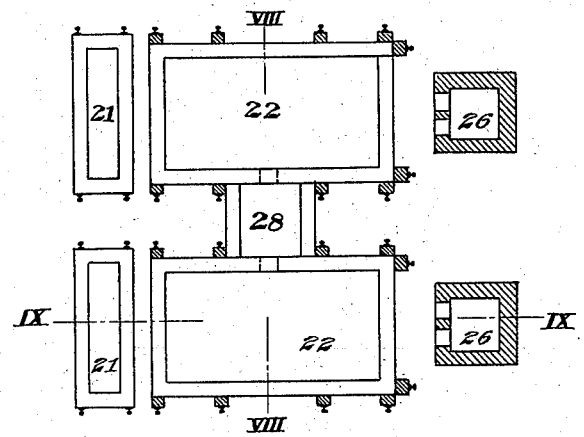
Figure 8:
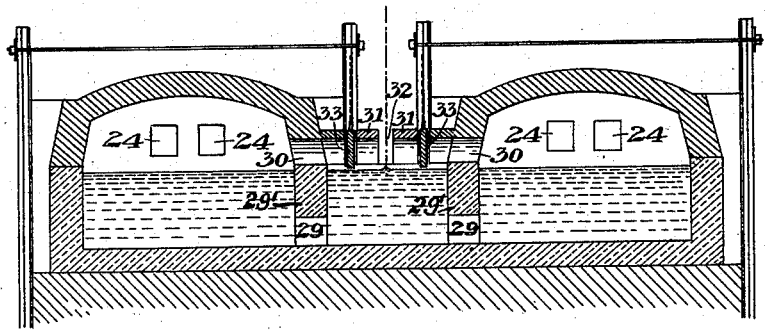
Figure 9:
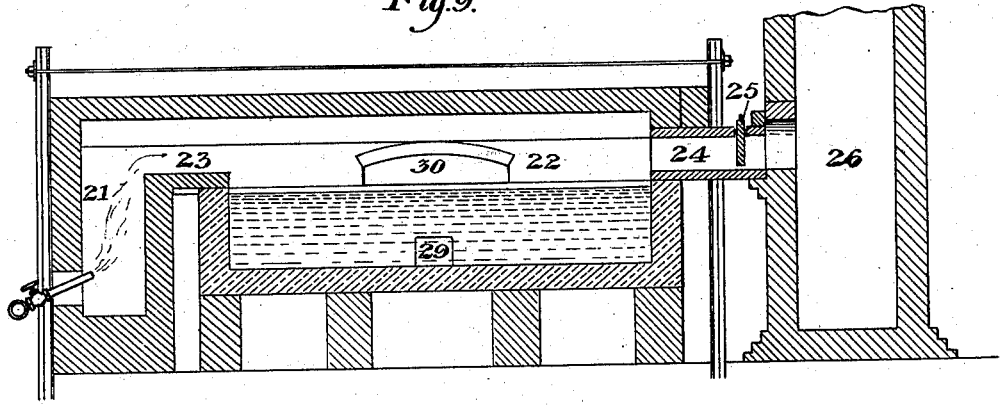

Figure 1 is a top plan view of a continuous regenerative glass-melting tank-furnace. Fig. 2 is a cross-section on the line II II of Fig. 1. Fig. 3 is an irregular cross-section on the line III III of Fig. 1. Fig. 4 is a cross-section on line IV IV of Fig. 1. Fig. 5 is a plan view of a double continuous regenerative tank-furnace. Fig. 6 is a longitudinal sectional view of the same. Fig. 7 is a plan view of a non-regenerative furnace. Fig. 8 is a section on the line VIII VIII of Fig. 7, and Fig. 9 is a longitudinal section on the line IX IX of Fig. 7.

My invention relates to glass-melting tank-furnaces and may be of the regenerative or other type, in which the fuel used to melt the glass batch is supplied from a suitable combustion-chamber.

Heretofore many attempts have been made to draw glass sheets or cylinders from a body of glass, and much difficulty has been encountered in maintaining a uniform temperature and plasticity in the body of glass from which the sheet or cylinder is drawn. A further difficulty has been encountered in maintaining a uniform temperature upon both sides of the sheet or cylinder, so that uneven drawings of the glass have occurred, rendering it impossible to draw cylinders or sheets of uniform thickness. A further difficulty has been encountered in constructing a tank-furnace in which the temperature of the drawing-chamber and the glass within the same can be regulated and kept uniform. My invention overcomes these difficulties in a simple and efficient manner and enables me to draw directly from a large body of glass constantly supplied from the melting-tank and easily maintained at the proper temperature.

My invention consists, broadly, in forming a tank-furnace having a melting-compartment and one or more drawing-compartments, the latter being connected to the former in such a way that the drawing-compartment receives a constant supply of glass from the melting-compartment through two or more channels leading into the drawing-compartment on opposite sides thereof, so that the temperature of the glass is kept uniform upon opposite sides of the sheet or cylinder as it is being drawn.

It further consists in providing ports or openings above the surface of the glass connecting the drawing-chamber and melting-chamber, by means of which the glass in the drawing-chamber is kept plastic by the heat passing through the ports on opposite sides of the drawing-chamber.

My invention is also designed to provide a shield or damper by which the heat of the drawing-chamber may be regulated.

It further consists in certain features of construction and combination of parts more fully hereinafter described, and pointed out in the claims.

In the drawings, referring to Figs. 1, 2, 3, and 4, 2 is the tank in which the glass batch is melted, the heat requisite to accomplish this melting being supplied from the air and gas ports 3 and 4 of the regenerative furnace 5 and 6 beneath the floor-level, communicating with the ports 3 and 4, respectively, the hot gases passing from the regenerator upon one side to the tank across the same and down through the corresponding flues upon the opposite side and thence to the stack. (Not shown in the drawings.) 7 7 are channels or connections between the melting-tank 2 and the drawing-chamber 8. These channels 7 7 and the chamber 8 contain refined glass suitable for drawing by any suitable mechanism into sheets or cylinders. 9 9 are floating bridges or dividers, which keep the quality of the glass in the channels 7 7 free from any impurities which may be present in the glass in the melting-tank 2. The tank proper is covered by a suitable arch 10, supported upon a shelf 11, formed of plates secured to buckstays 12, by which the furnace-walls are braced. Each of the channels 7 7 is covered by an arch 13, (shown in Fig. 2,) and these arches are supported in a manner similar to the roof-arch 10. The channels 7 7 communicate directly with and lead into the drawing-chamber 8 on opposite sides thereof, and the glass in the channels and the drawing-chamber is maintained at the same level and is constantly supplied from the melting-tank 2. The drawing-chamber 8 is covered by an arched roof of flat tile 14, having a slot or opening 15, through which the glass is drawn by suitable implements. (Not shown.) The doors 16 16, which are movable through slots 17 17, are provided with operating chains or ropes 18, having at their outer ends suitable counterweights 19 19. The glass in the channels 7 7 and in the drawing-chamber 8 is kept in the proper plastic condition by the heat from the melting-chamber 2, the doors 16 16 being raised or lowered, so as to regulate the temperature of the glass on both sides that is being drawn, so that the liability to uneven drawing is avoided. The slot 15 is made as narrow as is consistent with the operation of the drawing mechanism, and it may be provided with a suitable cover or shield to protect the cylinder or sheet from direct radiation of heat while being drawn.

In the form of furnace shown in Figs. 4 and 5 the melting-chambers 2' 2' are at opposite ends of the same, and the drawing-chambers 8' 8' communicate with the melting-chambers 2' 2' by means of the channels 7', the refined glass passing to the drawing-chamber being separated from the glass in the melting-tank by floaters or dividers 9'. These melting-tanks are supplied with necessary heat from a regenerative system similar to that shown in Figs. 1 to 3, the opposite ends of the furnace being duplicates of each other. The tank-roof 10' is supported upon the plates 11', carried on buckstays 12', as previously described. The roof-arch 14' of the drawing-chamber is supported upon the tank and is provided with a slot 15' and with doors 16' 16', which slide through openings 17' 17' and close the ports or openings which form the communication by which heat is supplied from the tank-chamber 2' to the drawing-chamber 8'. Operating chains or ropes 18' are employed by which the doors 16' 16' may be raised or lowered to regulate the amount of heat passing from the tank-chambers to the drawing-chambers, the heat being supplied to said chambers upon opposite sides of the sheet or cylinder, as described with reference to Figs. 1 to 4.

It may be desirable to separate the glass in the drawing-compartment from the channels leading from the melting-compartment by means of a floating or stationary bridge or divider on each side of the drawing-compartment, said bridge or divider extending above the surface of the glass immediately under the doors or dampers 16' 16' and provided with suitable openings below the surface of the glass for admitting glass to the drawing-compartment, as shown in Fig. 6, and this may be applied to all forms of furnace shown in the drawings.

In the form of furnace shown in Figs. 7 to 9 a furnace of the non-regenerative type is shown, in which 21 is the combustion-chamber, and 22 is the melting-tank. 23 is a bridge-wall between the combustion-chamber and the melting-tank, and 24 24 are stack flues or openings controlled by a damper 25, operated in any suitable manner, the flues 24 24 leading to the stack 26 at the end of the furnace. I prefer to arrange these furnaces in pairs and place one or more drawing-chambers 28 between them. The refined glass in the drawing-chamber may be separated from that in the melting-tank by floaters or floating bridges, or it may be supplied through ports 29 29 at or near the bottom of the bridges or dividers 29', as shown in the drawings. Heat-conducting ports 30 30 are formed directly above the tank-wall, and the roof 31 of the chamber 28 is supplied with a slot or opening 32 and doors 33 33, by which the heat supplied to the glass in the drawing-chamber and to the opposite sides of the sheet or cylinder being drawn is regulated, as previously described.

In carrying out my invention a batch of glass is placed in the tank or tanks and is melted in the usual way, either by heat supplied from a regenerative furnace or by that supplied by a combustion-chamber, as shown in the drawings Figs. 7 to 9. The glass as it is melted flows from the tank or tanks into the drawing-chamber, and the latter communicates with the tank or tanks by means of two or more channels or openings preferably oppositely disposed with respect to the point at which the glass is drawn from the drawing-chamber. That portion of the chamber above the glass communicates with the furnace-chamber in the melting-tank through ports or openings similarly disposed and controlled by suitable doors or dampers, so that the glass sheet or cylinder which is being drawn from the body of glass in the drawing-chamber is subjected to the same degree of heat upon opposite sides of the same, and at the same time the advantage derived from drawing from a deep body of glass is rendered possible by controlling the temperature in the drawing-chamber at the proper point for the drawing operation.

In the forms of furnace shown in Figs. 1 to 6, inclusive, the temperature of the glass in the melting-tank is regulated by valves of the regenerative system and the stack-damper in the usual way, and in the form of furnace shown in Figs. 7 to 9 the supply of fuel to the combustion-chamber and the damper in the flue leading to the stack control the temperature in the melting-chamber.

The advantages of my invention will be appreciated by those familiar with the requirements of a glass-melting furnace from which glass may be drawn directly in the form of a sheet or cylinder.

My improvement enables the temperature of the glass from which the sheet or cylinder is drawn and the temperature of the air in the chamber above the glass to be regulated at will, so that unequal drawing of the sheet or cylinder may be prevented.

It is obvious that, if desired, the walls of the drawing-chamber may be extended upwardly a considerable distance, so as to inclose the sheet or roller to a point considerably higher than that shown in the drawings.

Many changes may be made by the skilled furnace-builder in the disposition of the tanks with reference to the location of the drawing-chambers and other changes in the details of construction of the dampers by which the heat of the melting-tank and the drawing-chambers is maintained at the proper temperature for carrying out the drawing operation, since

What I claim is—

1. A glass-tank furnace having a melting-chamber, a drawing-chamber, and two channels from said melting-chamber leading into opposite sides of the drawing-chamber; the roofs of said channels being situate above the surface of the glass so that heat from the melting-chamber may have access to the surface of the glass in the channels, substantially as described.

2. A glass-tank furnace having a drawing-chamber provided with two oppositely-disposed sources of glass-supply, and ports or openings above the glass in said drawing-chamber for supplying heat to the glass in the drawing-chamber; substantially as described.

3. A tank-furnace, having a drawing-chamber, and a melting-chamber, oppositely-disposed channels or openings by which glass is supplied to said drawing-chamber from said melting-chamber, and oppositely-disposed ports or openings located above the glass in said drawing-chamber, arranged to supply heat from the melting-chamber to the glass in the drawing-chamber.

4. A tank-furnace, having a drawing-chamber provided with two oppositely-disposed sources of glass-supply and two oppositely-disposed sources of heat-supply, and doors or dampers arranged to control the heat entering said drawing-chamber, from the sources of heat-supply and a slot or opening in said chamber, through which the glass sheet or roller may be drawn.

5. A glass-tank furnace having a melting-chamber, a drawing-chamber, channels connecting the two, and a divider located in each of said channels; substantially as described.

6. A tank-furnace, having a melting-chamber and a drawing-chamber, said drawing-chamber being provided with a slot or opening through which the glass sheet or cylinder is drawn, oppositely-disposed ports in said chamber in communication with said melting-chamber, and shields or dampers located in proximity to said ports, whereby the temperature in said drawing-chamber may be regulated, and the sheet or cylinder protected during the drawing operation.

7. A tank-furnace, having a melting-chamber and a drawing-chamber, a plurality of channels leading from the melting-chamber to opposite sides of the drawing-chamber, and dividers having ports below the level of the glass, the dividers being situate in said channels and adjacent to the drawing-chamber.

8. A tank-furnace, having a melting-chamber and a drawing-chamber, a plurality of channels leading from the melting-chamber, and dividers situate between said melting-chamber and said drawing-chamber, and doors or dampers arranged to cut off the heat of the melting-chamber from the drawing-chamber, when desired.

In testimony whereof I have hereunto set my hand.

HENRY L. DIXON.

Witnesses:
L. A. CONNER, Jr.,
A. M. STEEN.